(12) United States Patent
Agner

(10) Patent No.: US 6,190,546 B1
(45) Date of Patent: *Feb. 20, 2001

(54) OIL SUCTION FILTER

(75) Inventor: Ivo Agner, Bad Homburg (DE)

(73) Assignee: Luk Fahrzeug-Hydraulik GmbH & Co. KG, Bad Homburg (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/885,785

(22) Filed: Jun. 30, 1997

(30) Foreign Application Priority Data

Jun. 29, 1996 (DE) .............................. 196 26 212

(51) Int. Cl.$^7$ .................................................... B01D 35/01
(52) U.S. Cl. ...................... 210/168; 210/188; 210/320; 210/335; 210/445; 210/455; 210/456; 210/489; 96/219; 96/220
(58) Field of Search .................................... 210/320, 445, 210/446, 448, 449, 455, 456, 460, 335, 489–491, 168, 171, 172, 232, 459, 461, 462; 96/206, 207, 215, 219, 220

(56) References Cited

U.S. PATENT DOCUMENTS

| | | | | |
|---|---|---|---|---|
| 1,460,867 | * | 7/1923 | Strowbridge | 210/435 |
| 1,488,671 | * | 4/1924 | Hale | 210/456 |
| 2,665,009 | * | 1/1954 | Harstick | 210/456 |
| 2,727,634 | * | 12/1955 | O'Meara | 210/456 |
| 3,371,793 | * | 3/1968 | Fowler | 210/445 |
| 3,384,241 | * | 5/1968 | Nostrand | 210/491 |
| 3,480,149 | * | 11/1969 | Houser | 210/445 |
| 3,513,982 | * | 5/1970 | Carter et al. | 210/493.1 |
| 3,640,839 | * | 2/1972 | Ochiai | 210/491 |
| 4,402,827 | * | 9/1983 | Joseph | 210/455 |
| 4,450,081 | * | 5/1984 | Anderson et al. | 210/445 |
| 4,828,694 | * | 5/1989 | Leason | 210/445 |
| 4,889,621 | | 12/1989 | Yamada et al. | . |
| 5,494,575 | * | 2/1996 | Kitajima et al. | 210/445 |
| 5,538,633 | * | 7/1996 | Kitajima et al. | 210/445 |

FOREIGN PATENT DOCUMENTS

| | | |
|---|---|---|
| 3906313 | 2/1990 | (DE) . |
| 0396385 | 11/1990 | (EP) . |

\* cited by examiner

*Primary Examiner*—Matthew O. Savage
(74) *Attorney, Agent, or Firm*—Ostrolenk, Faber, Gerb & Soffen, LLP

(57) ABSTRACT

An oil suction filter having an enclosed housing with a base surface and an oil intake opening, a top surface with an oil discharge opening, and a filter usually in the form of a filter cloth in the housing between the intake opening and the outlet. In one form, an oil diverting device at least partially surrounds the oil intake opening. In another form, an oil flow diverting device is provided at either or both of the oil intake opening and the oil outlet. In another form, an oil filter cloth has various densities, thicknesses or layers that control the flow. All the foregoing is for the purpose of minimizing formation of large air bubbles passing through the suction filter. Further, beads in the housing may keep the filter cloth off the base surface.

11 Claims, 4 Drawing Sheets

OIL SUCTION FILTER

BACKGROUND OF THE INVENTION

The invention relates to an oil suction filter, in particular for automatic gearboxes, having a housing which holds a filter and has an oil intake opening on its base surface.

Such filters are generally known. They are used to remove impurities from oil, sucked out of an oil sump, for example. For this reason, the oil suction filter is arranged with its oil intake opening pointing downward in the oil sump. The oil is thus sucked out from the underside of the housing through the filter into a duct which leads on and is arranged for example on the upper side of the housing.

In this process, air bubbles, which accumulate on the underside of the housing, also pass into the filter and ultimately also to the pump. The air bubbles themselves arise as a result of mechanical components, for example gear wheels of an automatic gearbox, which rotate in the oil sump and thus "beat" air into the oil, or as a result of splash oil which is used for cooling and is thus fed back into the oil sump.

The air which is also sucked in leads to increased generation of noise in the pump and to increased wear of the pump.

SUMMARY OF THE INVENTION

The object of the invention is to provide an oil suction filter which reduces the wear of the pump and reduces the production of noise.

This object is achieved by means of an oil suction filter which has an air diverting device that at least partially surrounds the oil intake opening. This prevents air bubbles which accumulate on the underside of the housing and which join together to form large air bubbles from passing into the filter together with the sucked in oil.

In a preferred exemplary embodiment, the air diverting device completely surrounds the oil intake opening. In this embodiment, the oil intake opening is completely shielded, so that no air bubbles which are located on the underside of the housing can penetrate into the oil suction filter.

In a further preferred exemplary embodiment, the oil intake opening is arranged in an edge region of the underside of the housing. Here, air bubbles are prevented from being sucked in even if the air diverting device does not completely surround the oil intake opening. The part which lies nearest to the edge of the housing does not necessarily have to be shielded by the air diverting device. Air bubbles do then also pass into the filter from the edge region. Since this edge region is small in comparison to the entire area of the underside, the quantity of air bubbles is also so small that a significant reduction in noise is achieved.

The air diverting device is preferably designed as a ring which completely surrounds the intake opening. The outer surface of the ring and its central axis extend essentially perpendicularly with respect to the base surface of the housing. This embodiment can be realized simply and cost effectively.

In a particularly preferred embodiment of the oil suction filter, there is provision for beads with an open edge to be provided in the base surface. This has the advantageous effect that the air bubbles rising from the bottom to the top accumulate in the beads and are directed to the edge of the oil suction filter. Since the beads are open here, the air bubbles are directed past or around the oil suction filter.

In a further preferred exemplary embodiment, the air diverting device protrudes at least approximately 3 mm beyond the base surface, that is, the height of the air diverting device is at least approximately 3 mm. It has in fact been found that the layer of air bubbles forming on the underside is usually not more than 3 mm. It is therefore essential for the height to be matched to the thickness of the layer of air bubbles.

Moreover, the object is achieved by an oil suction filter having a housing with an oil discharge opening, wherein the filter is arranged between the oil intake opening and the oil discharge opening and an oil deflection device is assigned to the oil intake opening and/or the oil discharge opening. This ensures that an inner space of the oil suction filter has a uniform flow through it, so that accumulation of air within the filter housing is avoided. The air is continuously transported away in the form of small air bubbles. This prevents a large number of small air bubbles from joining together to form a large undesired air bubble, in particular in a region with low oil flow which is also referred to as a dead region.

In a preferred embodiment, the oil deflection device comprises a wall region which runs essentially transversely with respect to the inflow or outflow direction. This has the effect that oil which is flowing into the oil suction filter cannot flow directly to the oil discharge opening but instead is deflected into the inner space, so that a lengthened flow path of the oil is produced and accumulations of air are avoided.

Finally, the object is to provide an oil suction filter which has various hydraulic resistances, so that a flow can be formed in the entire inner space of the oil suction filter. In addition, the flow velocity can be influenced selectively by means of the various hydraulic resistances. Consequently, direct discharge of oil from the oil intake opening to the oil discharge opening, as well as accumulations of air, are avoided.

In a preferred embodiment, the filter is formed from a filter cloth which has zones of different density and/or thickness in order to generate the various hydraulic resistances.

When a filter according to the invention is used, it produces a very uniform flow through the filter so that the formation of large air bubbles is essentially avoided. Moreover, the filtering action of the filter is extremely effective, that is, essentially all impurities are filtered out of the oil.

Other features and advantages of the present invention will become apparent from the following description of the invention which refers to the accompanying drawings.

BRIEF DESCRIPTION OF THE DRAWINGS

The invention is explained below by means of exemplary embodiments with reference to the drawings, in which.

DETAILED DESCRIPTION OF EMBODIMENTS OF THE INVENTION

Figure 1A:
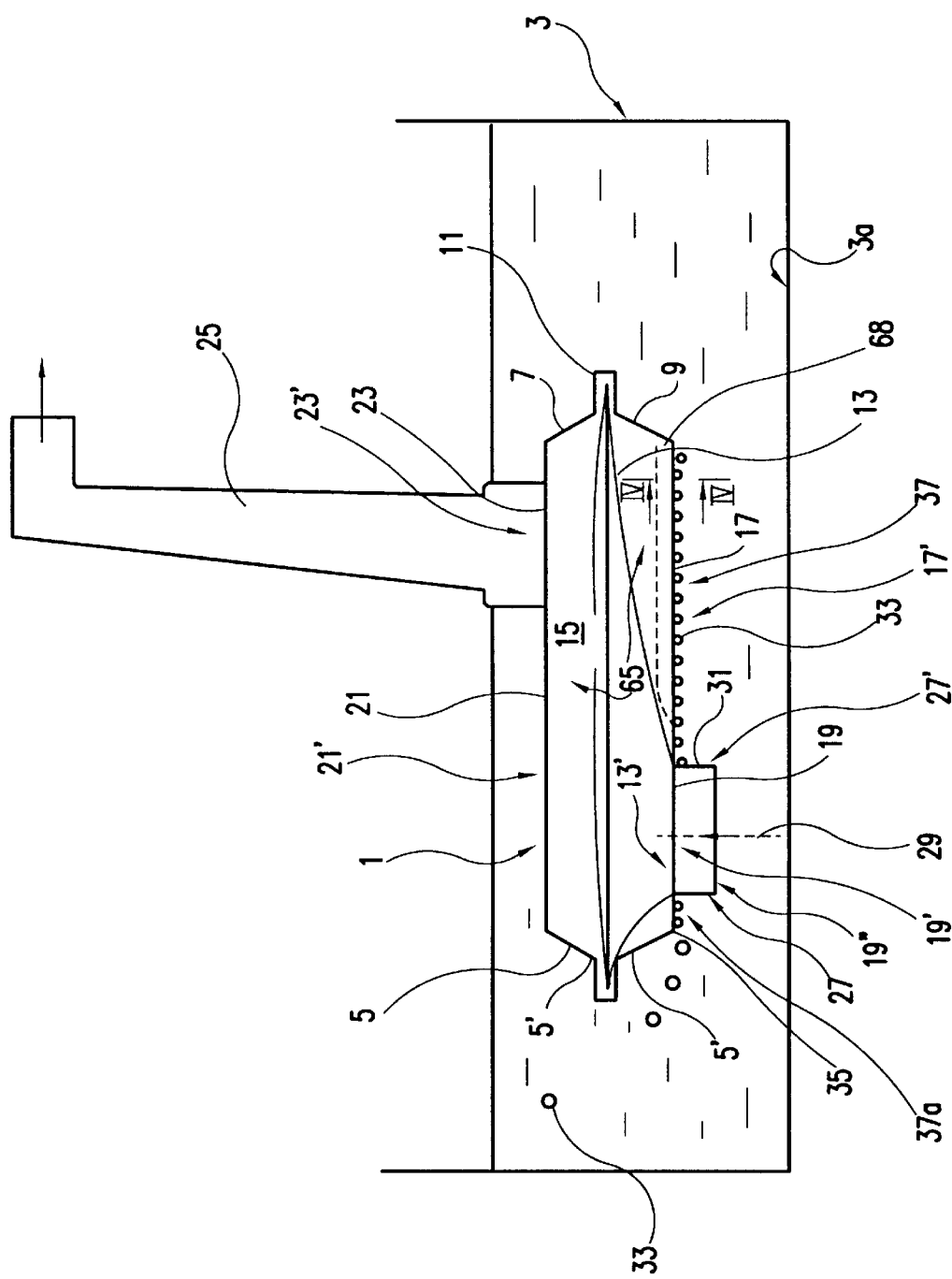
FIG. 1a is a schematic view of a first exemplary embodiment of an oil suction filter in an oil sump.

FIG. 1a shows an oil suction filter 1 which is arranged within an oil sump 3 filled with oil.

The oil suction filter 1 comprises a housing 5 which is comprised of two half shell shaped parts 7 and 9 which are fitted one on the other and are fixed to one another by means of flanging 11 at their edges.

There is a filter 13 (only shown schematically) within the housing 5 which is designed as a cloth and is arranged in an inner space 15 of the housing 5 which is surrounded by the parts 7 and 9.

The housing 5 has a base surface 17. An opening 19 into the inner space 15 is formed in the base surface 17, which lies at the bottom when the oil suction filter 1 is installed in an oil sump 3. The base surface 17 therefore forms an underside 17' and faces a base 3a of the oil sump 3.

As shown, the opening 19 is located at an edge region 35 of the base surface 17 and constitutes an oil intake opening 19'.

A surface 21 of the upper housing part 7 is directed upward and forms an upper side 21'. A further opening 23 in the upper side 21' is diametrically opposite the opening 19 and leads into a duct 25. It constitutes an oil discharge opening 23'.

The openings 23 and 19 are formed here as examples on the upper side 21' or underside 17', respectively. However, it is also possible to make at least one opening 19 or 23 in a wall region 5' of the housing 5 which extends obliquely here.

The purely schematically illustrated duct 25 is provided on the surface 21 and leads to a pump (not illustrated).

The opening 19 located at the bottom is surrounded by a ring 27, which forms an air diverting device 27' having a longitudinal axis 29 which is located essentially perpendicularly to and extending below the base surface 17. However, it is also possible for the ring 27 to include an annular collar 27a (FIG. 2a) which widens in a funnel shape in the direction of the base 3a, as this shape collects the air bubbles particularly effectively.

The ring 27 is securely connected at one of its ends to the base surface 17 of the lower housing part 9. It extends downward at least 3 mm in the longitudinal direction. The ring 27 can be integral with the part 9 of the housing 5 or else can be fitted on and, for example, clipped into the housing 5. An outer surface 31 of the ring 27 thus ensures that the inlet opening 19" which leads into the inner space 15 is located at a lower level than the base surface 17 of the lower housing part 9.

Moreover, FIG. 1a shows air bubbles 33. These air bubbles arise as a result of moving mechanical parts (not illustrated here), for example, parts of an automatic gearbox, which swirl the oil and thus introduce air. These air bubbles 33 rise upward to the surface of the oil owing to their specific weight. However, the air bubbles 33 which rise from underneath the base surface 17 do not pass immediately to the surface of the oil but rather accumulate on the underside 17' developing a layer of air, in which small air bubbles join together to form large ones.

During operation, the pump (not shown) sucks oil out of the oil sump 3 through the oil intake opening 19' into the inner space 15 and into the duct 25. During the suction process, the outer surface 31 of the ring 27 forms a barrier to the air bubbles 33 which have accumulated on the underside 17', so that air bubbles 33 cannot pass into the inner space 15. In a simple but effective way, this prevents a situation in which air is also sucked in, which leads to an increase in the production of noise.

Of course, the ring 27 can also be in other forms, provided that a barrier is formed which surrounds the opening 19 and which prevents air bubbles 33 from being whirled into the inner space 15. Thus, for example, the outer surface 31 can become wider or narrower in a funnel shape counter to the inflow direction running upward in FIG. 1a or can run obliquely upward or downward, rather than perpendicularly with respect to the base surface 17.

A very good reduction in noise is also achieved if the outer surface 31 only partially surrounds the opening 19. A "discontinuous" ring may therefore be provided. Its outer surface may in particular face a region 37 of the underside 17' which has a larger area than a region 37a of the underside 17'. This design is preferably provided if the opening 19 is arranged in the vicinity of an edge region 35. In this case, the air bubbles which have accumulated in the region 37a would in fact be sucked into the inner space 15 owing to the absence of a barrier. However, since this region 37a has a relatively small area, the sucked-in quantity of air is also negligibly small.

If a flow is formed underneath the filter, the air diverting device 27' is arranged in such a way that the air bubbles are not flushed into the oil suction filter 1. The air diverting device 27' is therefore provided on the side of the oil intake opening 19' which faces the flow. In this case, the oil intake opening 19' does not necessarily have to be arranged in the edge region 35 of the underside 17' of the housing 5. If the air diverting device 27' completely surrounds the oil intake opening 19', it does not need to be arranged in the edge region 35 in this case either.

Figure 4:
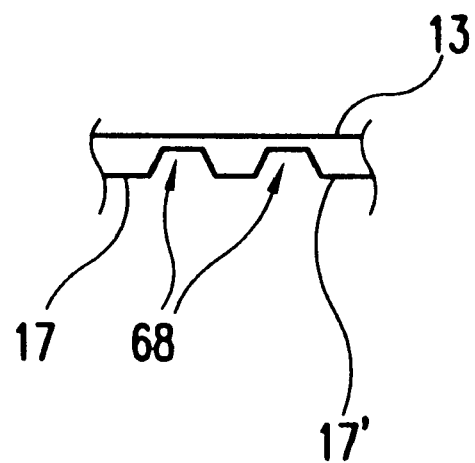
FIG. 3 is a schematic view of a fourth exemplary embodiment of an oil suction filter and FIG. 4 is a partial section of the oil suction filter according to FIG. 1a along the line IV—IV.

FIG. 4 shows, in a further refinement of the oil suction filter, the base surface 17 which is provided with upraised ribs or beads 68 which preferably run parallel to one another. This produces ribs which project into the interior of the housing. This refinement holds the filter 13 at a distance from the base surface. This also prevents a filter wall of the filter 13 facing the beads 68 from bearing against the inner side of the base surface 17. Accordingly, the oil can pass through the filter wall and be sucked away via the duct 25. In order to prevent too much air from accumulating in the ribs or beads 68 on the underside 17' of the base surface, the ribs or beads 68 are designed with edges which are open toward the edge of the housing. This causes the air which accumulates to flow upward past the housing 5.

Figure 1B:
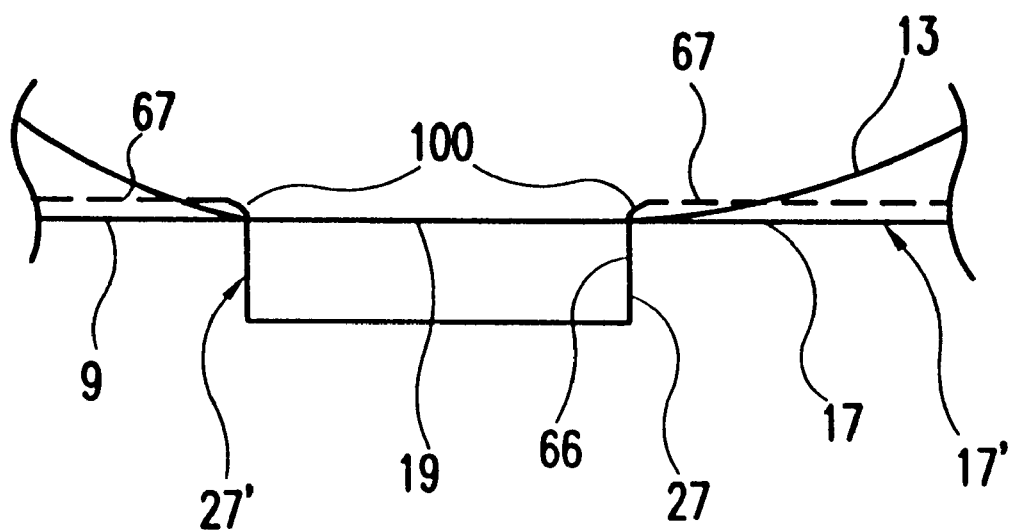
FIG. 1b is a partial view of the oil filter according to FIG. 1a in the region of a housing opening.

In FIG. 1b, a region of the opening 19 is illustrated. It is clear that the filter 13, which is designed as a filter cloth, and preferably as a filter bag, is attached in a suitable way to a region of the part 9 of the housing 5 which bounds the opening 19. This has the effect that oil which has been sucked into the oil suction filter flows directly into the filter bag, flows through the filter walls of the filter bag into the inner space 15 of the housing (arrows 65, FIG. 1a) and passes to the pump via the duct 25.

Furthermore, in FIG. 1b the ring 27 of the air diverting device 27' is designed as a clip on part 66 which comprises at least two latching projections 67 which hold the ring 27 on the housing 5 at an edge 100 of opening 19. This enables the air diverting device 27' to be attached easily.

Figure 2A:
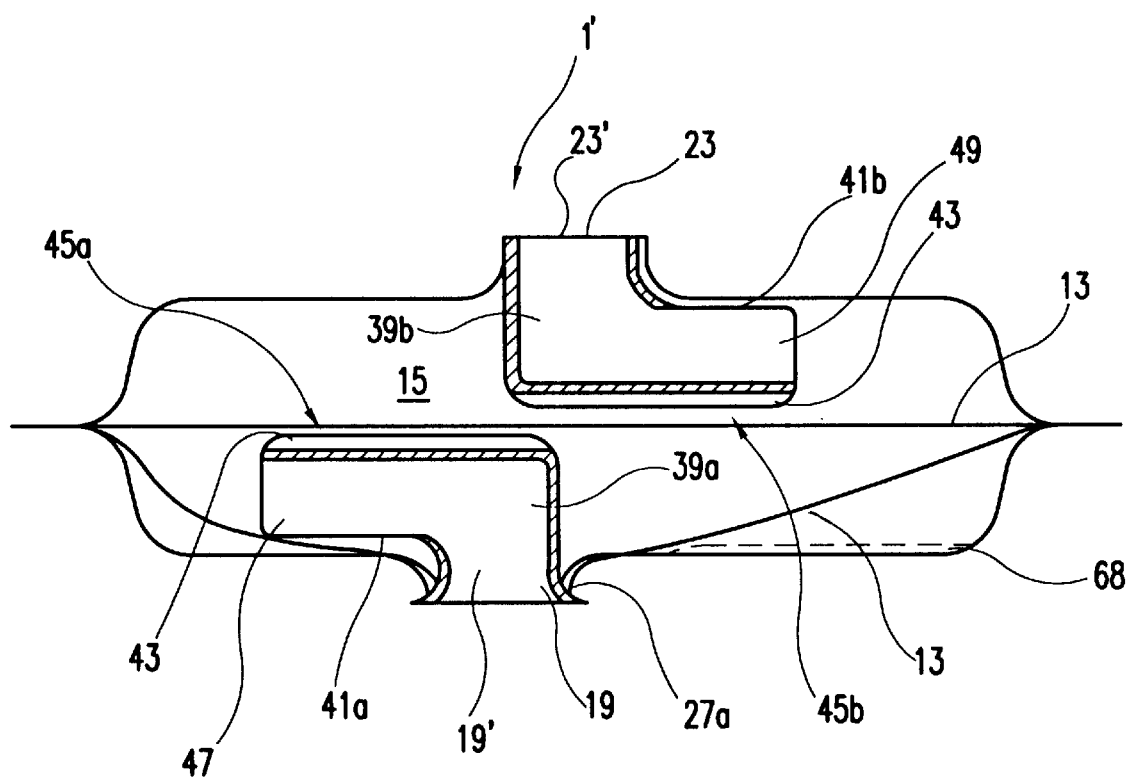
FIG. 2a is a schematic cross section view of a second exemplary embodiment of an oil suction filter.

FIG. 2a shows a further embodiment of an oil suction filter 1'. It corresponds essentially to the example explained in conjunction with FIG. 1a, so that parts referred to by the same reference symbols are not described again.

The difference in this embodiment is that an oil deflection device 41a is inserted into the oil intake opening 19' of the oil suction filter 1 and an oil deflection device 41b is inserted into the oil discharge opening 23'. The oil deflection devices 41a and 41b are formed by a tubular section 39a or 39b and a wall region 45a or 45b which runs essentially transversely to the inflow or outflow directions of the oil and also forms a ceiling which is connected to the section 39a. As a result, the oil is directed through an oil inlet opening 47, downstream, viewed in the direction of flow, of the oil intake opening 19', into the inner space 15 and deflected by approximately 90° with respect to the perpendicular inflow direction. The oil deflection device 41b, which is associated with the oil discharge opening 23', forms at its wall region an oil outlet opening 49 which is offset with respect to the oil discharge opening 23', so that overall a lengthened oil flow path in the inner space 15 is produced. The oil deflection device 41a or 41b also has the function of deflecting the inflowing oil in such a way that the entire inner space of the oil suction filter 1 has a uniform flow through it. In particular, the intention is that the flow through the filter 13 will be uniform and at a relatively low velocity.

Figure 2B:
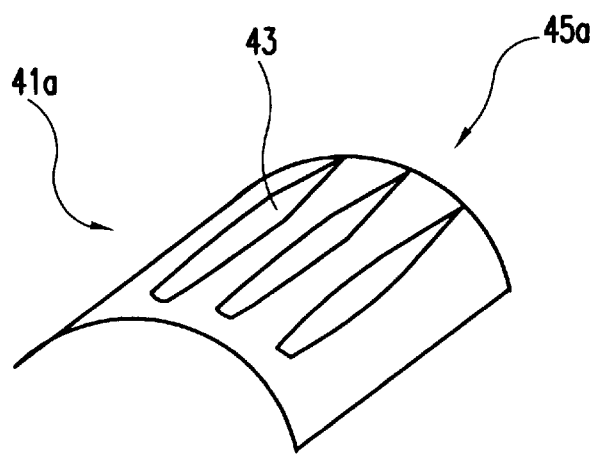
FIG. 2b is a perspective view of part of that embodiment.

The oil deflection device 41a, which is basically identical in design to the oil deflection device 41b, is shown only partially in FIG. 2b. The wall region 45a is of half shell shaped design, and longitudinally running ribs 43 are provided on the shell. This shape prevents the inflowing oil from flowing away directly upward to the opening 23 but instead deflects it mainly to the side.

The advantage of the oil deflection device 41a is that the uniform flow through the inner space prevents an accumulation of air and thus the formation of relatively large air bubbles. The air is instead continuously transported away in the form of small air bubbles. As a result, a large number of small air bubbles cannot join together to form a large air bubble which, if it were to pass through the oil suction filter 1, would have adverse effects in terms of the noise behavior and cause wear of the pump.

Figure 2C:
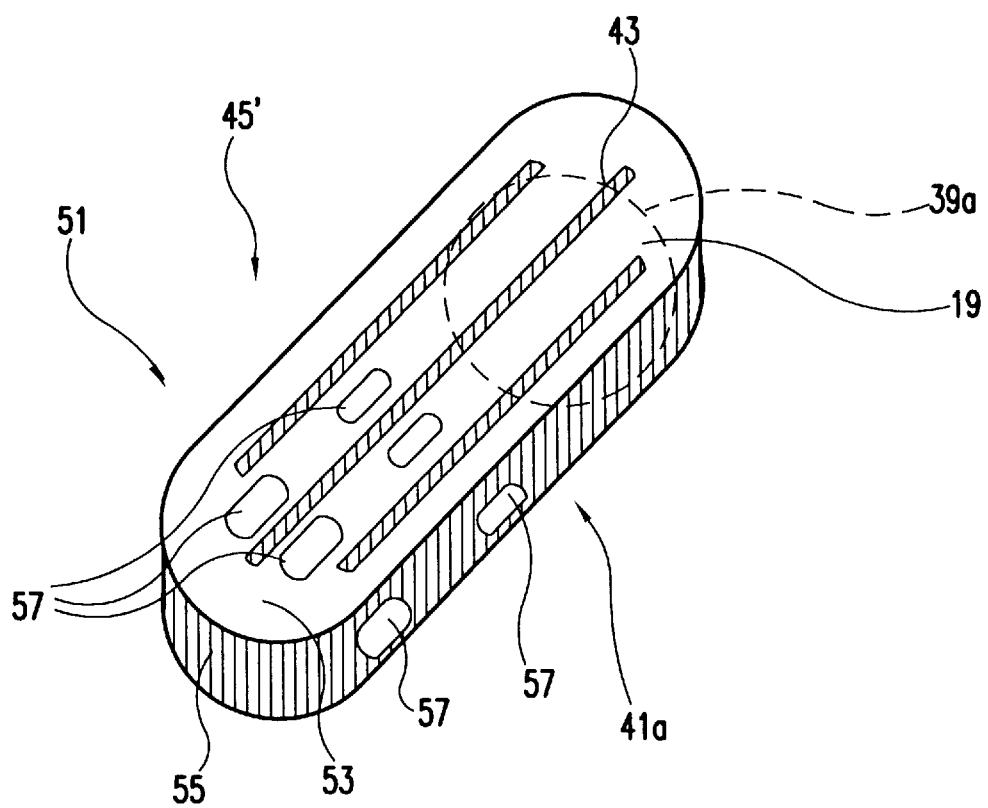
FIG. 2c is a schematic perspective view of a third exemplary embodiment.

FIG. 2c shows a modified exemplary embodiment of an oil deflection device 41a with a wall region 45' which spans the opening 19 and forms a ceiling. The wall region 45' is realized by means of a hood 51 which comprises a base plate 53 and an edge 55 surrounding the plate. The hood 51 is preferably connected by its edge 55 to the tubular section 39a of the oil deflection device 41a. The peripheral edge 55 runs preferably at a right angle with respect to the base plate 53. It is of integral construction with the base plate 53. Through openings 57, which preferably have different opening cross sectional areas, are provided in the base plate 53 and in the edge 55. As a result, various hydraulic resistances are formed, which distribute the inflowing oil virtually in the entire inner space 15 (FIG. 2a). Preferably, the through openings 57 which are nearer to the tubular section 39a have a smaller opening cross-sectional area than those which are further away. In particular, the opening cross-sectional area of the through openings 57 becomes larger with increasing distance from the section 39a. As a result, approximately the same quantity of oil is let into the filter from each through opening 57.

The oil deflection device 41a according to FIG. 2c is preferably associated with the oil intake opening 19'. A preferably identical design oil deflection device 41b is associated with the oil discharge opening 23'. Of course, oil deflection devices 41a, 41b in accordance with FIG. 2b may be combined with oil deflection devices like those were explained with reference to FIG. 2c.

Figure 3:
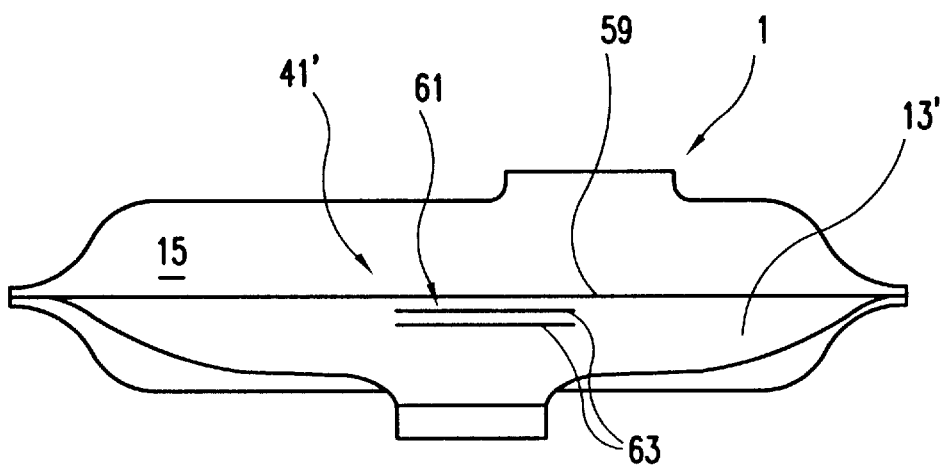

FIG. 3 shows a further exemplary embodiment of an oil deflection device 41' which is realized using a filter 13'. The filter 13' is inserted into the inner space 15 of the oil suction filter 1. The oil deflection device 41' is formed by the filter 13' including regions with different hydraulic resistances. The hydraulic resistances can be formed using a filter cloth 59 which has zones with different densities and/or thicknesses. The different densities are realized, for example, by pressing the filter cloth 59 together at least in certain regions. Alternatively, a filter cloth may also be used which comprises various materials of different densities/thicknesses.

Alternatively, the filter 13' can be formed using a filter cloth 59 which comprises at least one region 61 with a different number of filter mats 63. The individual filter mats 63 can preferably be bonded to one another, riveted or connected in some other way.

The regions having a higher flow resistance of the filter 13' are realized by means of regions with thicker, denser and/or more filter mats. At these regions, less oil can be sucked through the filter material. This also permits a long flow path to be realized in the inner space 15 of the oil suction filter 1, and it is possible to also influence the flow velocity of the oil. Consequently, relatively large air bubbles can be avoided by means of a continuous and uniform flow of oil in the inner space 15 of the oil suction filter 1.

Of course, it is also possible to provide an oil suction filter which comprises the air diverting device 27', the oil deflection device 41a, 41b and/or the filter 13'. There may also be provision for the oil suction filter to comprise at least two of these devices. These devices can therefore be combined freely with one another.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An oil suction filter, comprising:
   a housing defining an enclosed interior and having an edge around the housing, the housing having a base surface, the base surface having an inner side facing into the interior of the housing and having an outer side opposite the inner side;
   an oil intake opening into the interior through the base surface, the oil intake opening having a central axis;
   an oil outlet from the housing;
   a filter disposed in the housing between the oil intake opening and the oil outlet for filtering oil passing therethrough;
   an oil deflection device disposed in the housing and forming a ceiling over the oil intake opening that is substantially transverse to the central axis of the oil intake opening, wherein the ceiling of the oil deflection device comprises a region of the filter that has higher flow resistance than the surrounding filter such that less oil can be sucked through the filter material in the region, and wherein the region of the filter comprises a plurality of filter mats.

2. The oil suction filter of claim 1 further comprising:
   an air diverting device at least partially surrounding the oil intake opening for diverting air bubbles at the base surface away from the oil intake opening.

3. The oil suction filter of claim 2, wherein the air diverting device completely surrounds the oil intake opening for blocking entry of bubbles around the entire intake opening.

4. The oil suction filter of claim 2, wherein the base surface has an edge region toward the edge and the oil intake opening is disposed generally in the edge region of the base surface; and the air diverting device faces a large surface region of the base surface away from the edge region and beyond the oil intake opening.

5. The oil suction filter of claim 2, wherein the oil intake opening faces an oil flow running underneath the housing and the air diverting device faces the edge of the oil intake opening.

6. The oil suction filter of claim 2, wherein the air diverting device comprises a ring around the oil intake opening.

7. The oil suction filter of claim 6, wherein the ring is clipped to the housing.

8. The oil suction filter of claim 6, wherein the ring has an outer surface and the ring outer surface extends generally at a right angle to the base surface of the housing and extends away from the base surface.

9. The oil suction filter of claim 6, wherein the base surface is essentially planar.

10. The oil suction filter of claim 2, wherein the base surface is essentially planar.

11. The oil suction filter of claim 2, wherein the air diverting device has a height of at least 3 mm.

* * * * *